United States Patent [19]

Hill

[11] Patent Number: 5,161,360
[45] Date of Patent: Nov. 10, 1992

[54] GENTLE RAKE

[76] Inventor: Jean A. Hill, 3130 Dover Rd., Silver Lake, Ohio 44224

[21] Appl. No.: 781,816

[22] Filed: Oct. 23, 1991

[51] Int. Cl.$^5$ ............................................. A01D 7/06
[52] U.S. Cl. ............................... 56/400.17; 56/400.21
[58] Field of Search .......... 56/400.17, 400.01, 400.16, 56/400.18, 400.21

[56] References Cited

U.S. PATENT DOCUMENTS

| | | | |
|---|---|---|---|
| 226,419 | 4/1880 | Quigley. | |
| 393,105 | 11/1888 | Gunn. | |
| 1,682,795 | 9/1928 | Morgan. | |
| 2,065,830 | 12/1936 | Sherman. | |
| 2,463,393 | 3/1949 | Key | 56/400.17 |
| 2,468,376 | 4/1949 | Peeples | 56/400.21 |
| 2,663,987 | 12/1953 | Biener | 56/400.17 |
| 2,794,312 | 6/1957 | Finkes | 56/400.17 |
| 3,707,835 | 1/1973 | McNally | 56/400.01 |
| 4,219,993 | 9/1980 | Cosmos | 56/400.17 |
| 4,831,815 | 5/1989 | Bonnes | 56/400.17 |

Primary Examiner—Terry Lee Melius
Attorney, Agent, or Firm—Oldham, Oldham & Wilson Co.

[57] ABSTRACT

A head for a rake has a fan-shaped body with a plurality of fingers radiating from an attachment to a rake handle. The individual fingers have three portions: a base portion, a middle portion and a tip portion. The base portion of each finger is generally rectangular in profile; the middle portion is generally rectangular with the sides being arcuate outwardly; and the tip portion is a circular arc segment with the chord segment thereof comprising the proximal end of said portion. A reinforcing rib is positioned normal to the bottom surface of each portion of each finger, the reinforcing rib originating along the length of the base portion and extending continuously to the distal end of the tip portion. The head is preferably molded from a thermoplastic compound such as polyethylene, polypropylene, or polyurethane.

21 Claims, 3 Drawing Sheets

GENTLE RAKE

The present invention relates to a garden implement, particularly a rake head that is adapted to gently remove leaves, grass clippings, thatch and other loose debris around groundcover spreading plants such as ivies, pachysandra and the like. More particularly it relates to a rake head having molded finger-like tines that assist in separating these groundcover materials from the loose debris so that removal of the debris from the groundcover plants is easily effected.

BACKGROUND ART

The use of flexible rake heads in the collection of leaves, grass clippings, and the like is well known and well documented. A continuing disadvantage of all of the known rakes is that they easily entangle themselves with spreading groundcover plants so that the use of such a rake near such plants results in either poor removal of the debris or in damage to the groundcover plants. The present invention offers a novel tool and novel head for a tool that is useful in gently removing loose debris, leaves and the like without damaging the live groundcover foliage.

SUMMARY OF THE INVENTION

An object of the invention is to provide a tool that effectively removes leaves, grass and other loose debris from around living spreading groundcover foliage such as ivy, pachysandra and the like without damaging the foliage.

This and other objects of the invention are achieved by a head for a rake having a generally fan-shaped body with an upper and a lower side. A plurality of fingers radiate from a centrally-positioned means for attaching a handle on the body. Moving from the proximal end to the distal end of each finger, it is seen to have a base portion, a middle portion and a tip portion, with each portion being generally planar. Each base portion has a reinforcing rib positioned normal to its lower side along at least the distal half of its length and each middle and tip portion has a reinforcing rib along its entire length thereof, the reinforcing rib below each portion being smoothly integral with the reinforcing rib below the next adjacent portion. The base portion of each finger has a rectangular profile when viewed normally with the thickness of the reinforcing rib therebelow increasing smoothly from the proximal end to the distal end. The middle portion of each finger is angled downwardly from the base portion, its normal profile thereof being generally rectangular with outwardly arcuate sides, and the reinforcing rib therebelow being of generally constant thickness. The tip portion of each finger is downwardly angled even further from the middle portion, its normal profile thereof being that of a circular arc segment with its chord portion integral with the distal end of the middle portion and the arc portion comprising the distal end of the tip portion. The reinforcing rib below the tip portion is smoothly outwardly arcuate. This head for a rake is preferably comprised of a molded thermoplastic compound, especially polyethylene, polypropylene or polyurethane. When a transverse section is taken of any portion of any finger, the reinforcing rib gives the section a T-shape. The angular separation between adjacent fingers is in the range of about 3 to about 9 degrees, preferably about 6 degrees. The circular arc segment comprising the tip portion of each finger has a subtended angle in the range of about 90 to about 180 degrees, preferably about 135 degrees. The preferred length to width ratio of the base portion of each finger is in the range of about 3:1 to about 8:1 and the preferred length to width ratio of the middle portion of each finger is about 2:1 at the distal and proximal ends and is about 8:3 at the midpoint between the distal and proximal ends, where the portion is widest. The ratio of the width of each base portion of each said finger to its thickness is about 8:1. The interdigital spaces between adjacent fingers are smoothly inwardly arcuate and all intersecting surfaces on the fingers are smoothly rounded. The preferred downward angle between the base portion and the middle portion is about 30 degrees, and the preferred downward angle between the middle portion and the tip portion is about 50 degrees.

BRIEF DESCRIPTION OF THE DRAWINGS

Understanding of the invention is assisted by reference to the attached drawings presented herewith, wherein identical parts are identified by identical reference numbers, and in which.

DETAILED DESCRIPTION OF THE DRAWINGS

Figure 1:
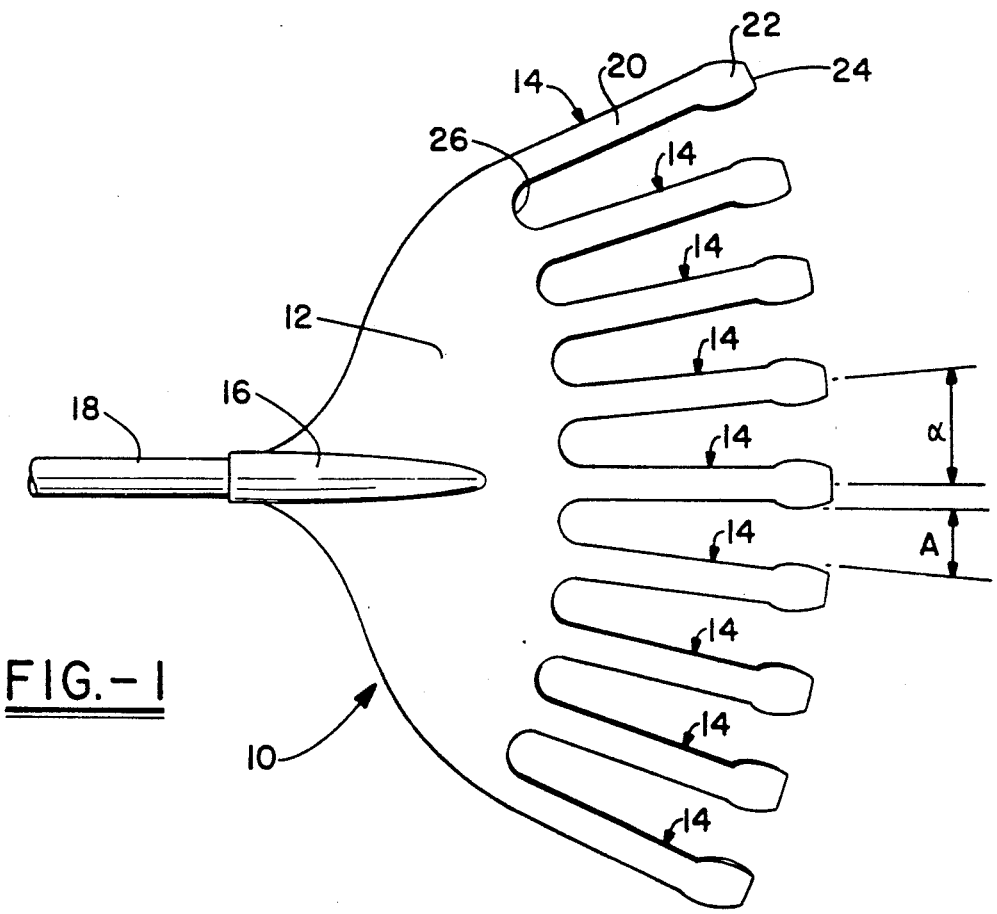
FIG. 1 shows a top plan view of the rake of the present invention.

FIG. 1 shows a top view of the rake head 10 of the present invention. The major elements visible in FIG. 1 include the generally fan shaped body 12 with upper and lower sides, the upper side being visible in this view, and a plurality of fingers 14 that generally radiate outwardly from a point on the handle portion generally behind the means for attachment 16 of the body 12 onto a handle 18. The rake head 12 bears a resemblance to the human hand and the analogy of the fingers 14 with the human fingers is appropriate as will be indicated by later description. The angular separation α of adjacent individual fingers 14 is in the range of 3° to 9°, with the preferred angular separation being approximately 6° from center line to center line on adjacent individual fingers. The minimal separation A between adjacent fingers 14 is about 1.7 times the width of the finger 14 as measured at base portion 20. Although the exact detail of the fingers 14 is better illustrated in later drawings, particularly FIG. 7, certain features of the fingers as they are arranged adjacent to each other are best seen in FIG. 1.

Figure 2:
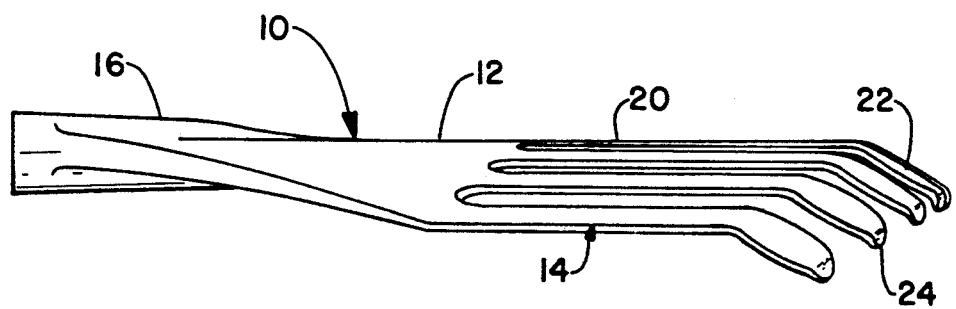
FIG. 2 a side view of the novel rake of the present invention.
Figure 5:
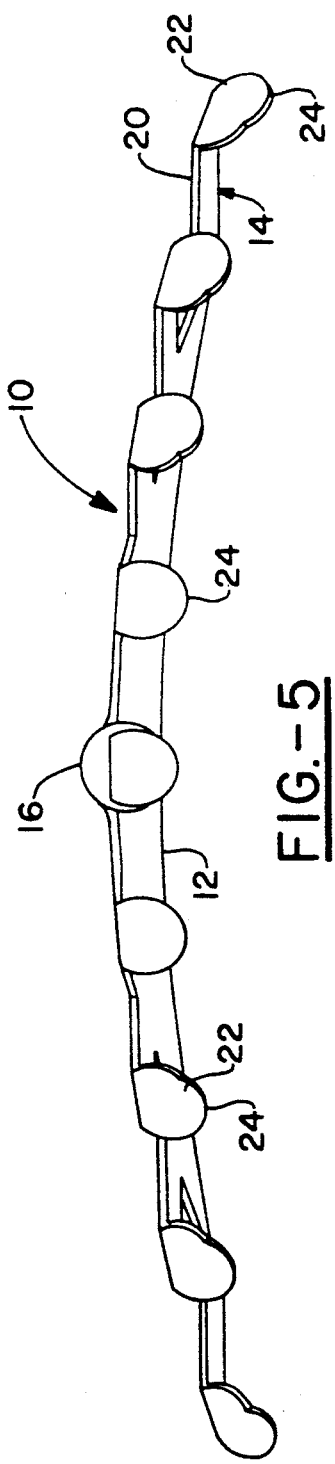
FIG. 5 shows a front view of the rake of the present invention.
Figure 7:
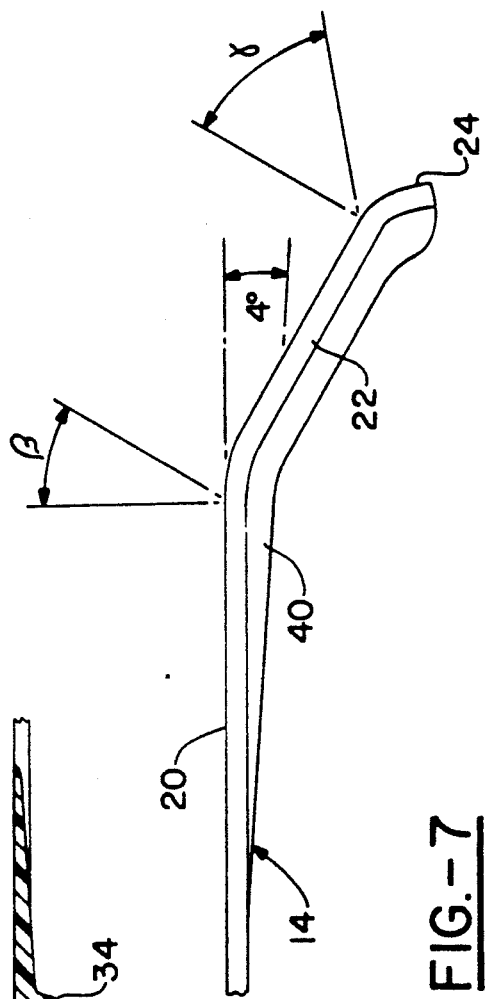
FIG. 7 shows a side view of a typical finger of the rake of the invention.

For example, each individual finger 14 comprises, moving outwardly from the body 12 to the distal end of the finger, three distinct portions: a base portion 20, a middle portion 22 and tip portion 24. When viewed normally to its top surface, each separate portion of the finger 14 has a different profile or shape. The base portion 20 has a rectangular profile when viewed normally, the length of the portion being approximately six times as long as width thereof. The thickness of the base portion 20, although not shown in FIG. 1 but more clearly indicated in FIGS. 2, 5 and 7, is approximately ⅓ the width of the base portion. The interdigital spaces 26 between adjacent base portions 20 at their proximal ends are smoothly arcuate to prevent snagging or tearing of foliage.

The middle portion 22 is integrally affixed at its proximal end with the distal end of the base portion 20, and has the same width as the base portion. The width of the middle portion 22 increases arcuately and then decreases similarly so that the width at the distal end of the middle portion is approximately the same as the width at the proximal end thereof. The length of the middle portion 22 is approximately twice the width of the middle portion at either end of the middle portion, and, due to the outwardly arcuate nature of the sides, the width of the middle portion toward the center of the length is approximately 4/3 the width of the middle portion at either end thereof.

As best shown in FIG. 5, the tip portion 24 of the finger 14 is a circular segment with the chord portion of the circular segment integral with the distal end of the middle portion 22 and the arc portion of the circular segment comprising the outward or distal portion of the tip 24. The circular segment is sized so that the length of the tip portion is approximately ½ the width of the tip portion 24 at its chord segment, the angle subtended by the chord segment being approximately 135°. As the essential feature of this rounding is to present a rounded tip portion 24, it will be understood that the circular segment used for the tip could easily be as large as a circular segment having a subtended angle of 180°, that is, a semi-circle, and the angle subtended could be reduced at least as low as 90°. Clearly, the preferred subtended angle is about 135°.

Attention is now directed to FIG. 2 where a side view of the rake head 10 is disclosed. In this view, the cylindrical tube 16 that acts as the means for attaching a handle is clearly obvious as are the fingers 14 radially extending from the body 12. This side view shows a detail not shown in FIG. 1. The three portions 20, 22 and 24 of individual fingers 14 are arranged so that the base portion 20 is essentially parallel to the axis of the handle 18, but the middle portion 22 and tip portion 24 of each finger 14 are angled downwardly, in a manner somewhat analogous to the natural downward flexion of the human fingers at each knuckle. More detail regarding this angularity is described below with relation to FIG. 7.

FIG. 2 also shows much more clearly the shape of the individual tip portions 24 on the individual fingers 14.

Figure 3:
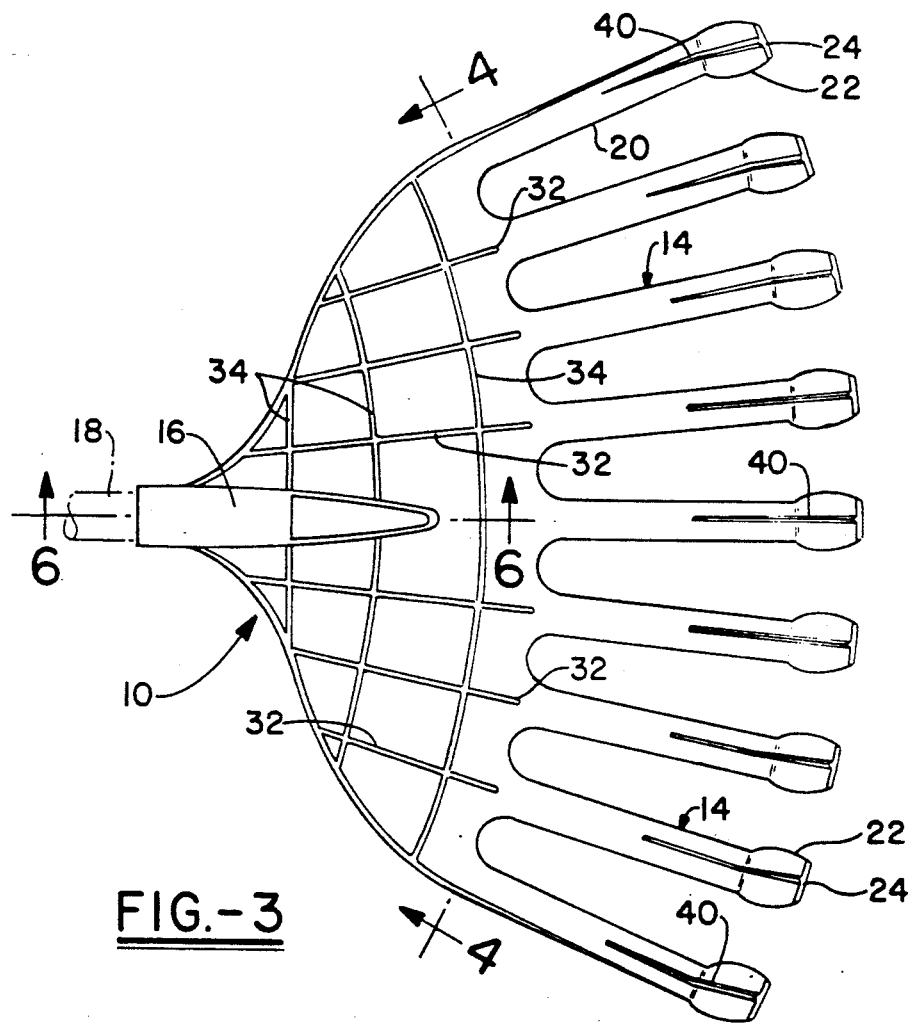
FIG. 3 a bottom view of the novel rake of the present invention.

FIG. 3 shows the underside of the novel rake head 10 of the present invention, i.e. a view 180° opposed from the view shown in FIG. 1. The series of reinforcing ribs 32, 34 shown at the base of body 12 are intended to give strength and stability to the body 12 and to generally add rigidity thereto. The particular pattern of reinforcement, i.e. a series of generally radial ribs 32 and a series of intersecting arcuate ribs 34, is not necessarily a feature of the invention, as the exact means of reinforcing such a body 12 would be relatively obvious to one of skill in this art. An important feature of FIG. 3 is the reinforcing rib 40 that runs longitudinally along each finger 14. This rib 40 originates at a point slightly beyond mid-point of the length between the proximal and distal end of the base portion 20. The rib 40 starts with a thickness, i.e. the distance from which it projects from the lower surface of the finger 14, of zero and increases smoothly as the distal end of the base portion 20 is approached. This feature is more clearly illustrated in FIG. 7 and further attention to that point is presented below. The width of the rib 40, i.e., the size of the rib 40 transverse to the longitudinal axis of the finger 14, is generally about the same as the thickness of the individual finger portions 20, 22 and 24. In other words, a transverse section of a finger 14 at a portion where the rib 40 is present would show a T-shape in which the width of the cross-bar and the thickness of the upright shaft of the "T" are approximately the same.

Figure 4:
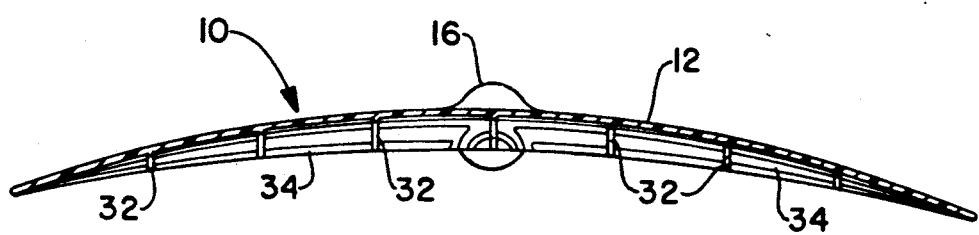
FIG. 4 shows a sectional view of the novel rake of the present invention taken along Line 4—4 in FIG. 3.

FIG. 4 shows a section of the rake head 10 taken along Line 4—4 in FIG. 3. As illustrated somewhat in FIG. 2 and shown much more clearly in FIG. 4, there is a generally arcuate nature to the rake head 10 based upon a focus that is below the bottom side of the rake head so that the overall head 10 has a crowned or arched appearance, again not dissimilar to that of the human hand. This same arched or crowned aspect of the rake head 10 is again presented in FIG. 5, which is a plan view taken from the distal end of the rake head 10 looking back toward the handle 18.

Figure 6:
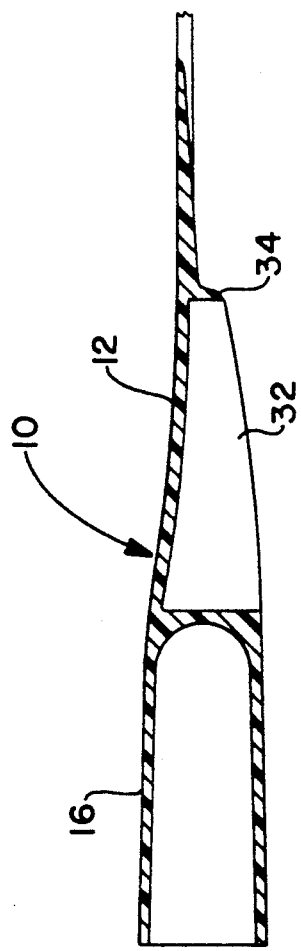
FIG. 6 shows a sectional view of the present invention taken along Line 6—6 in FIG. 2.

A section taken through Lines 6—6 in FIG. 3 is presented as FIG. 6 to show the cylindrical nature of the preferred means 16 of attaching a handle 18 into the rake head 10 and also to illustrate the shape of the reinforcing ribs 32 and 34 at the body 12, which are smoothly decreasing in thickness as they approach the proximal end of the fingers 14, so that a point of flexion is presented at the junction between the body 12 and the proximal end of the finger.

A side view of a single individual finger 14 is presented in FIG. 7. This figure does not present the full length of the base portion 20, so the reinforcing rib 40 appears to begin at a point relatively close to the proximal end of base potion, at the left side of the drawing. The omitted section of the base portion 20 is unremarkable and is not shown for that reason. The smoothly increasing thickness of the reinforcing rib 40 is shown as being at a angle of approximately 4°, although variation on either side of this would certainly be acceptable. The relative angularity of the three portions of each finger is also clearly shown. The middle portion 22 is at an angle β of approximately 30° downwardly from the base portion 20 and the tip portion 24 is disposed at an angle γ of approximately 50° downwardly from the middle portion 22. In other words, the top surface of the tip portion 24 makes an angle with the top surface of the base portion 20 of approximately 80°. FIG. 7 also clearly shows that the thickness of the reinforcing rib 40 is essentially constant along the length of the middle portion 22 and that the thickness of the reinforcing rib 40 directly below the tip portion 24 arcuately increases and then decreases outwardly so that the reinforcing rib 40 blends smoothly into the tip 24. It is also noted that the points of intersection for each of the portions of each finger 14, both along the finger portions themselves and along the reinforcing rib 40 are smoothly arcuate so that no sharp projections are presented which would serve as points for growing foliage to be snagged and thereby torn. In fact, it is noted that all surfaces on the fingers 14 are smoothly rounded to prevent such snags of living material. This smooth arcuate presentation of all surfaces is also noted at the point of connection 26 of the respective base portions 20 to the body 12 where this connection is smoothly arcuate, exactly analogous to the smooth arcuate skin webbing that is presented in the interdigital spaces of a human hand.

As indicated on the hatching on FIGS. 4 and 6, the preferred embodiment of the present invention is a rake head 10 that is molded from a thermoplastic material. Many such materials are known and the exact selection would be within the scope of ordinary skill in this art. The thermoplastic materials that would be of particular interest would include the polyethylenes, the polypropylenes, and the polyurethanes. The polypropylenes are probably especially preferred because of the capability of such polymers to acquire increased strength due to flexing of the molded polymer. This is not to say that the present invention may not be practiced by forming the rake head 10 from metallic elements, although the large number of relatively thin parts joined in perpendicular relationship would be practical only in a molding scheme and would probably not be economically feasible. To produce such a piece of metallic elements from a non-molding method would require a large amount of welding and the welds, due to the flexing of the elements, would be subject to severe stresses.

While in accordance with the patent statutes, the best mode and preferred embodiment of the invention have been described, it is to be understood that the invention is not limited thereto, but rather is to be measured by the scope and spirit of the appended claims.

What is claimed is:

1. A head for a rake comprising:
   a generally fan-shaped body with an upper and a lower side with a plurality of fingers radiating from a centrally-positioned means for attaching a handle;
   each said finger having, from the proximal end to the distal end thereof: a base portion, a middle portion and a tip portion;
   each said portion of each said finger being generally planar;
   each said base portion having a reinforcing rib positioned normal to the lower side thereof along at least the distal half of its length and each said middle and tip portion having a reinforcing rib along the entire length thereof, the reinforcing rib below each portion being smoothly integral with the reinforcing rib below the next adjacent portion;
   the base portion of each said finger having a rectangular profile when viewed normally with the thickness of the reinforcing rib therebelow increasing smoothly from the proximal end to the distal end;
   the middle portion of each said finger angled downwardly from the base portion, the normal profile thereof being generally rectangular with outwardly arcuate sides, and the reinforcing rib therebelow being of generally constant thickness;
   the tip portion of each said finger being further downwardly angled from the middle portion, the normal profile thereof being that of a circular arc segment with the chord portion thereof integral with the distal end of the middle portion and the arc portion comprising the distal end of the tip portion and the reinforcing rib therebelow being smoothly outwardly arcuate.

2. The head for a rake according to claim 1 wherein the head is comprised of a molded thermoplastic compound.

3. The head for a rake according to claim 1 wherein the reinforcing rib along each said portion of each said finger is positioned so that a section taken transverse to the length of the portion is T-shaped.

4. The head for a rake according to claim 1 wherein the angular separation between fingers is in the range of about 3 to about 9 degrees.

5. The head for a rake according to claim 4 wherein the angular separation between fingers is about 6 degrees.

6. The head for a rake according to claim 1 wherein the circular arc segment comprising the tip portion of each said finger has a subtended angle in the range of about 90 to about 180 degrees.

7. The head for a rake according to claim 6 wherein the subtended angle is about 135 degrees.

8. The head for a rake according to claim 1 wherein the length to width ratio of the base portion of each said finger is in the range of about 3:1 to about 8:1.

9. The head for a rake according to claim 1 wherein the length to width ratio of the middle portion of each said finger is about 2:1 at the distal and proximal end thereof and is about 8:3 at the midpoint between the distal and proximal ends.

10. The head for a rake according to claim 1 wherein the ratio of the width of each said base portion of each said finger to the thickness thereof is about 8:1.

11. The head for a rake according to claim 1 wherein the interdigital spaces between adjacent fingers are smoothly inwardly arcuate.

12. The head for a rake according to claim 1 wherein all intersecting surfaces on the fingers are smoothly rounded.

13. The head for a rake according to claim 1 wherein the downward angle between said base portion and said middle portion is about 30 degrees.

14. The head for a rake according to claim 1 wherein the downward angle between said middle portion and said tip portion is about 50 degrees.

15. A rake comprising:
   a generally fan-shaped body with an upper and a lower side with a plurality of fingers radiating from a centrally-positioned means for attaching a handle;
   each said finger having, from the proximal end to the distal end thereof: a base portion, a middle portion and a tip portion;
   each said portion of each said finger being generally planar;
   each said base portion having a reinforcing rib positioned normal to the lower side thereof along at least the distal half of its length and each said middle and tip portion having a reinforcing rib along the entire length thereof, the reinforcing rib below each portion being smoothly integral with the reinforcing rib below the next adjacent portion;
   the base portion of each said finger having a rectangular profile when viewed normally with the thickness of the reinforcing rib therebelow increasing smoothly from the proximal end to the distal end;
   the middle portion of each said finger angled downwardly from the base portion, the normal profile thereof being generally rectangular with outwardly arcuate sides, and the reinforcing rib therebelow being of generally constant thickness;
   the tip portion of each said finger being further downwardly angled from the middle portion, the normal profile thereof being that of a circular arc segment with the chord portion thereof integral with the distal end of the middle portion and the arc portion comprising the distal end of the tip portion and the reinforcing rib therebelow being smoothly outwardly arcuate; and a handle attached thereto by the means for attaching a handle.

16. The rake according to claim 15 wherein the head is comprised of a molded thermoplastic compound.

17. The rake according to claim 15 wherein the angular separation between the longitudinal axes of adjacent fingers is about 6 degrees.

18. The rake according to claim 15 wherein the circular arc segment comprising the tip portion of each said finger has a subtended angle of about 135 degrees.

19. The rake according to claim 15 wherein the ratio of the width of each said base portion of each said finger to the thickness thereof is about 8:1.

20. The rake according to claim 15 wherein the interdigital spaces between adjacent fingers are smoothly inwardly arcuate.

21. The rake according to claim 15 wherein all intersecting surfaces on the fingers are smoothly rounded.

* * * * *